United States Patent [19]

Inoue

[11] 4,265,292

[45] May 5, 1981

[54] RADIAL TIRES

[75] Inventor: Teruo Inoue, Yao, Japan

[73] Assignee: The Toyo Rubber Industry Co., Ltd., Osaka, Japan

[21] Appl. No.: 32,103

[22] Filed: Apr. 20, 1979

[30] Foreign Application Priority Data

Apr. 24, 1978 [JP] Japan .................................. 53/48884

[51] Int. Cl.³ .............................................. B60C 15/06
[52] U.S. Cl. ............................ 152/354 R; 152/362 R; 152/362 CS
[58] Field of Search ............... 152/330 R, 354, 362 R, 152/362 CS

[56] References Cited

U.S. PATENT DOCUMENTS

| 3,853,163 | 12/1974 | Mezzanotte ...................... 152/362 R |
| 3,895,666 | 7/1975 | Inoue ................................ 152/362 R |
| 4,046,183 | 9/1977 | Takahashi et al. .............. 152/362 R |
| 4,085,787 | 4/1978 | Maiocchi ......................... 152/362 R |

Primary Examiner—John E. Kittle
Attorney, Agent, or Firm—Wenderoth, Lind & Ponack

[57] ABSTRACT

A radial tire having carcass plies of polyester cords in which all or part of carcass plies are folded from the inside of bead core to the outside and a steel chafer outside the folded edges or a reinforcing layer of organic fiber.

The steel chafer has a cord angle of 15°–45°, and a height H equal to 15–28% of the tire internal height IH. The maximum height h of the folded edges of the carcass plies is at most 85% of the height H of the steel chafer and the cord angle of the organic fiber reinforcing layer is 20°–75° with respect to the tire circumferential direction and 10° or more with the cords in the steel chafer.

4 Claims, 8 Drawing Figures

RADIAL TIRES

BACKGROUND OF THE INVENTION

1. Field of the Invention

This invention relates to an improvement in or relating to radial tires, and more particularly an improvement in a bead structure of a radial tire comprising polyester cord carcass plies one edge of which is folded back around a bead core, and a steel chafer of reinforcing metallic cords provided outside the folded edges of the carcass plies and further comprising a reinforcing layer of organic fiber outside the steel chafer.

2. Prior Art

In comparison with steel cords, polyester cords undergo less deterioration in strength and adhesion due to moisture and enjoy a higher degree of fatigue resistance. In addition, the polyester cords produce a smaller tire growth than nylon cords. Thus, polyester cords are most desirable as carcass cord material.

Several carcass ply structures are well known: (1) all carcass plies are folded from the inside of the bead core to the outside (FIG. 1A); (2) some carcass plies are terminated at the inside or lower end of the bead core and the other carcass plies are folded from the inside to the outside of the bead core (FIG. 1B); (3) some carcass plies are folded from the inside to the outside of the bead core and others from the outside to the inside (FIG. 2); and so forth. The former two structures (FIGS. 1A and 1B) are easier to manufacture and more popular than the latter structure (FIG. 2), whereas the former structures are inferior to the latter in rigidity at the head region (FIG. 2) and even to the same structure using steel cords in the same way. Since those tires are subject to greater deformation in use, stress concentration occurs at the folded edges of the carcass plies and at the upper end of the steel chafer.

Elongation of the cords within the carcass plies due to tension exerted thereupon during use of the tires is approximately 0.5% when steel cords are used in the carcass plies, and approximately 5% when polyester cords are used. Therefore, as denoted by the arrow in FIG. 3, the strain occurring between the folded edges of the carcass plies or the upper end of the steel chafer and the peripheral rubber is increased. The stress concentration and strain tend to cause separation at the folded edges of the respective carcass plies and the upper end of the steel chafer.

As measures to avoid those problems, the bead region can be made of hard rubber or the folded edges of the carcass plies can be terminated at an elevated level above the upper end of the steel chafer. However, these measures fail to provide the required durability. Because, the respective carcass plies contain a substantial number of cords to maintain toughness of the carcass plies, a large number of cord ends are present at the cross section of the folded edges of the carcass plies. The cross section of the folded edges are not subjected to chemical treatment, and this is one of the reasons causing separation. Concerning the structure where the folded edges of the carcass plies are terminated at an elevated level above the upper end of the steel chafer, the folded edges of the carcass plies are located in a region subjected to great load deformation during use of the tire, and this is another cause of separation. Moreover, since the folded edges of the carcass plies are located at an angle of approximately 90° relative to the circumferential direction of the tires, it is impossible to absorb deformation while a load is on the tires and the folded edges act to peck the peripheral rubber material, thereby causing and promoting separation.

It is, therefore, desirable to terminate the folded edges of the carcass plies at a region below the upper end of the steel chafer where strain is comparatively small. The upper end of the steel chafer is a free end and has less rigidity and particularly bending rigidity than the central portion thereof, the rigidity being increased gradually from the top to the center. To use successfully such properties of the steel chafer, it is necessary to determine the height of the folded edges of the carcass plies and the height of the steel chafer, taking into account the relative position between the folded edges of the carcass plies and the steel chafer, and the separation resistant properties of the steel chafer at its upper end.

In addition, separation will occur at the upper end of the steel chafer in used radial tires which are used subjected to heavy duty use for a long period of time, for example, radial tires for truck or bus use. In other words, a rigidity differential is necessarily developed about the upper end of the steel chafer and causes separation easily. Moreover, the upper end of the steel chafer itself is free and easily movable due to load deformation during tire use, thereby further enhancing the possibility of causing and promoting separation.

SUMMARY OF THE INVENTION

It is therefore an object of the present invention to provide a highly durable radial tire which avoids separation at the bead portion by improving the relative position of the folded edges of polyester cord carcass plies and a steel chafer, in other words, the relationship between the height of the steel chafer and the height of the folded edges of the carcass plies.

It is another object of the present invention to provide a highly durable and long life radial tire which is not subjected to separation trouble at the upper end of a steel chafer under heavy duty and long term use conditions.

The present invention accomplishes the above objects by providing a radial tire having the following features. One of the important features of the present invention is that the maximum height (h) of the folded edges of the carcass plies is less than 85% of the height (H) of the steel chafer, viz, h≦0.85H, and the height (H) of the steel chafer is selected to be 15–28% of the inside height (IH) of the tire where the cords are at an angle of 15°–45° with respect to the circumferential direction of the tire. Another feature is that there is provided a reinforcing layer of organic fiber cords outside of the steel chafer and covering the upper end thereof, so as to increase separation resistance around the upper end of the steel chafer, and the organic fiber cords are at an angle of 20°–75° with respect to the circumferential direction of the tire and crossed at an angle of 10° or more with the cords of the steel chafer.

The above described objects and features of the present invention will be more fully understood by reference to the following description taken in conjunction with the accompanying drawings.

DETAILED DESCRIPTION OF THE INVENTION

Figure 1A:
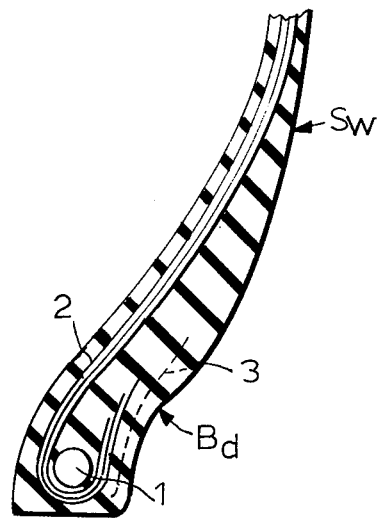
FIGS. 1A, 1B and 2 are representations of cross-sections of the bead part of several types of carcass ply structures.
Figure 1B:
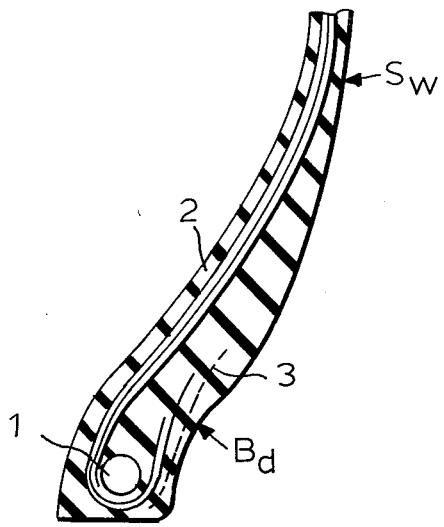
Figure 2:
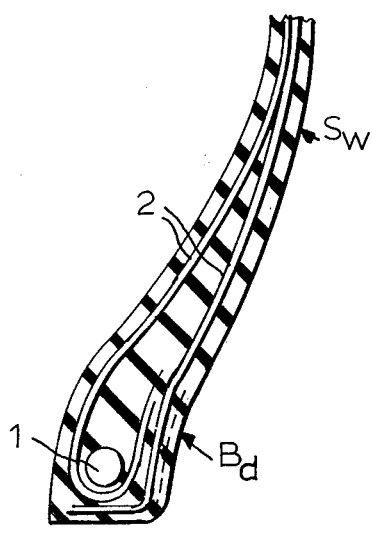
Figure 3:
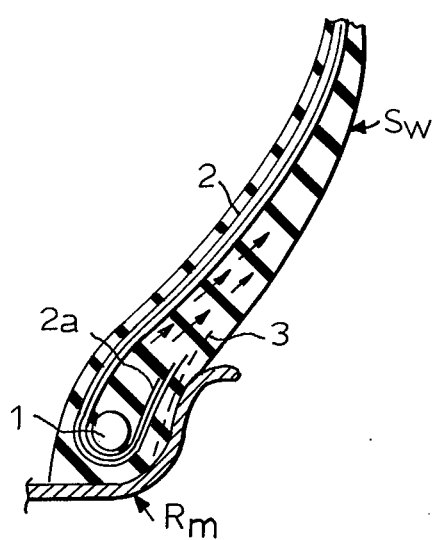
FIG. 3 is a representation of a cross-section of a structure like that of FIG. 1 and showing the relative strain which is developed between the folded edges of carcass plies or the upper end of a steel chafer and the peripheral rubber material in this prior art bead structure.

Referring now to FIGS. 1A, 1B and 2, there are illustrated a few examples of carcass ply structure. FIG. 1A is a carcass ply structure where all carcass plies 2 are folded from the inside of bead core 1 to the outside and a steel chafer 3 is provided outside of the bead core 1. In FIG. 1B, some of the carcass plies 2 end at the inside or lower side of the bead core 1 and the remaining carcass plies are folded from the inside of the bead core 1 to the outside and the steel chafer 3 is provided outside of the bead core 1. FIG. 2 depicts a structure where some of the carcass plies are folded from the inside of the bead core 1 to the outside and the remaining carcass plies are folded from the outside of the bead core 1 to the inside. The structure of FIG. 2 has a comparatively good rigidity in the bead region Bd but is complicated to manufacture. Although the structures of FIGS. 1A and 1B are relatively easy to manufacture, the rigidity in the bead region is low so that the tire is susceptible to large deformation during use and stress is concentrated at the folded edges of the carcass plies 2 and the upper end of the steel chafer 3. In addition, since the carcass plies using polyester cords undergo a large amount of elongation, as indicated in FIG. 3, relative strain between the folded portions 2a of the carcass plies 2 or the upper end of the steel chafer 3 and the peripheral rubber portion is increased which is a cause of separation at the folded edges of the carcass plies 2 and around the upper end of the steel chafer 3 due to the above discussed stress concentration. In the drawings, the side wall is labeled Sw.

Figure 6:
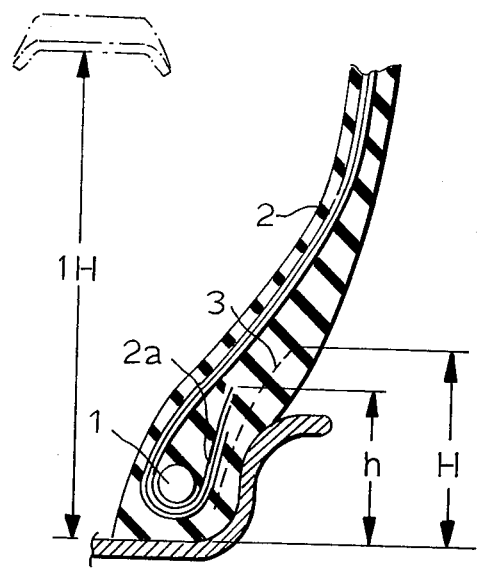
FIG. 6 is a representation of the cross-section of the bead part of an improved radial tire according to the present invention.

The present invention is concerned with radial tires having the types of carcass ply structures shown in FIG. 1A and 1B and is intended to improve separation resistance of the bead portion. FIG. 6 illustrates one preferred form of the present invention wherein all the carcass plies 2 are folded from the inside of the bead core 1 to the outside in the carcass ply structure of the radial tires.

The height h of the highest edge of the folded portions 2a of the carcass plies 2 relative to the height H of the steel chafer 3 provided outside the carcass plies 2 is h≦0.85H and the edge is thus located at 85% of the height H of the steel chafer 3. In order to assure the reinforcing effects of the steel chafer and prevent the occurrence of separation at the upper end of the steel chafer, the height H of the steel chafer 3 is made to be within the range of 15%–28% of the inside height IH of the tire and the steel chafer is aligned at an angle of 15°–45° with respect to the circumferential direction of the tire.

Table 1 sets forth the results of experiments conducted for investigating the effects of the relationship between the height H of the steel chafer and the maximum height h of the edges of the folded carcass plies, upon failures in the bead regions. As test tires, 1000R20 14PR tires were used, in which all three carcass plies of 1500d/3 polyester cords were folded from the inside of the bead core to the outside and a steel chafer was aligned at an angle of 25° with respect to the circumferential direction of the tire.

TABLE 1

| | | item | | | |
|---|---|---|---|---|---|
| Tire No. | steel chafer height (H mm) | carcass ply edge maximum height (h mm) | h/H | running distance (Km) | failure |
| A | 55 | 78 | 1.42 | 6400 | ply edge separated |
| B | 55 | 65 | 1.18 | 5800 | ply edge separated |
| C | 55 | 50 | 0.91 | 9300 | ply edge separated |
| D | 55 | 45 | 0.82 | 12000 | no failure |
| E | 60 | 78 | 1.30 | 6700 | ply edge separated |
| F | 60 | 55 | 0.92 | 8900 | ply edge separated |
| G | 60 | 50 | 0.83 | 12000 | no failure |

It is clear from the foregoing table that, whereas in the tires A, B, C, E and F where the maximum height h of the folded edges of the carcass plies was more than 85% of the height H of the steel chafer, the ply edges were separated after running a distance from 5800 Km through 9300 Km no failures were found in the tires D and G where the height h was less than 85% of height H even after running a distance of 12000 Km. These findings were obtained from the structure in which all the carcass plies were folded from the inside of the bead core to the outside as indicated in FIGS. 1A and 6. The foregoing is also true for the structure as shown in FIG. 1B in which some of the carcass plies end at the inside or lower end of the bead core.

With such an arrangement, separation resistance in the bead region is remarkably improved under ordinary use conditions. However, in radial tires used under heavy duty and long term use conditions, for example, radial tires for truck or bus use, there is still the possibility that separation will develop around the upper end of the steel chafer and cause failure in the bead region.

Figure 4:
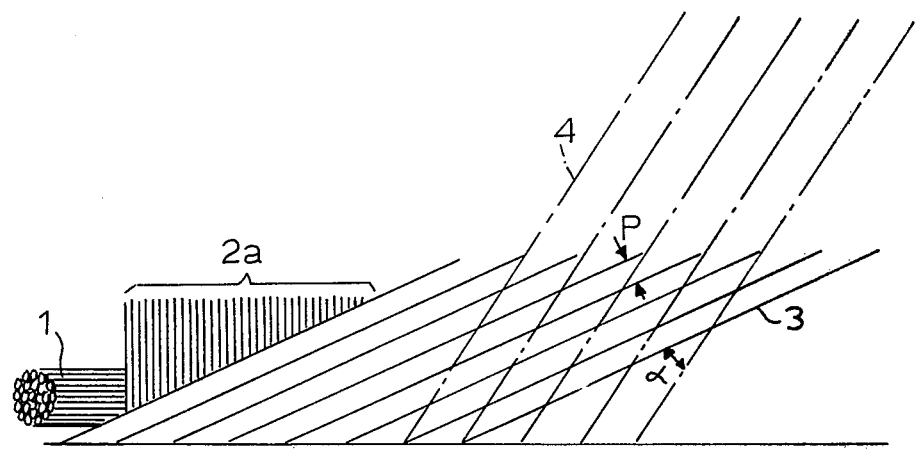
FIG. 4 is a diagrammatic representation of the cord alignments of the folded edges of carcass plies, a steel chafer external thereto, and a reinforcing layer of organic fiber further external thereto.

In other words, radial tires achieving the object of the present invention, or tires with a carcass ply structure where the carcass plies are made of polyester cords and all or most of the carcass plies are folded from inside to outside around the bead core, have lower rigidity and particularly bending rigidity and undergo greater deformation during use than counterparts using steel cord carcass plies or having the structure indicated in FIG. 2. For those tires which undergo greater deformation under loaded conditions, a rigidity differential at the upper end of the steel chafer and movability of the upper or free end of the steel chafer impair substantially the separation resistant properties of the bead region. In particular, movement of the cords located near the upper end of the steel chafer tends to make the cord spacing P (see FIG. 4) wider under the loaded conditions and cause these cords to separate from the rubber material.

Figure 7:
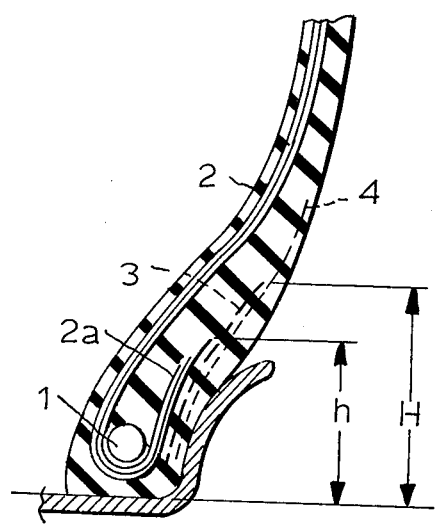
FIG. 7 is a representation of the cross-section of the bead part of the radial tire according to the present invention where an organic fiber reinforcing layer is provided outside of the steel chafer.

The present invention avoids the above described problem in another preferred form as shown in FIG. 7, in which there is further provided at least one reinforcing layer 4 including organic fiber material outside the steel chafer 3, and the maximum height h of the edge 2a of the folded carcass plies 2 and the height H of the steel chafer 3 are in the relation $h \leq 0.85H$. The reinforcing layer 4 extends from the bottom of the bead region Bd to a position above the upper end of the steel chafer so as to cover the upper end of the steel chafer. The organic fiber cords in the reinforcing layer 4 are at an angle of 20°–75° with respect to the circumferential direction of the tire and cross at an angle α (see FIG. 4) of at least 10° with the cords in the steel chafer. This structure reduces the rigidity differential around the upper end of the steel chafer to a minimum and suppresses movement of the free and easily movable upper end of the steel chafer. An important consideration is the alignment angle of the organic fiber cords. Although the provision of the reinforcing layer of organic fiber outside the steel chafer serves the purpose of minimizing rigidity differential developed at the upper end of the steel chafer, the rigidity and particularly the bending rigidity of the cords in the steel chafer is larger than that of the cords in the organic fiber reinforcing layer and concentration of stress at the upper end of the steel chafer is unavoidable during use of the tire. Such concentrated stress is transmitted to the reinforcing layer of organic fiber provided outside the steel chafer so that the upper end of the steel chafer undergoes a greater degree of local strain. Therefore, it is necessary to select the cord angle of the organic fiber reinforcing layer with respect to the circumferential direction of the tire so that the cords in the organic fiber reinforcing layer withstand such strain and do not fatigue or break.

To this end the inventors investigated carefully the effect of the cord angle of the organic fiber reinforcing layer with respect to circumferential direction of the tire and the cord angle with respect to the steel chafer cords (namely, the crossing angle α), upon the separation resistant properties. As a result, the optimum angle was found to be 20°–75° for the former and 10° or more for the latter.

Figure 5:
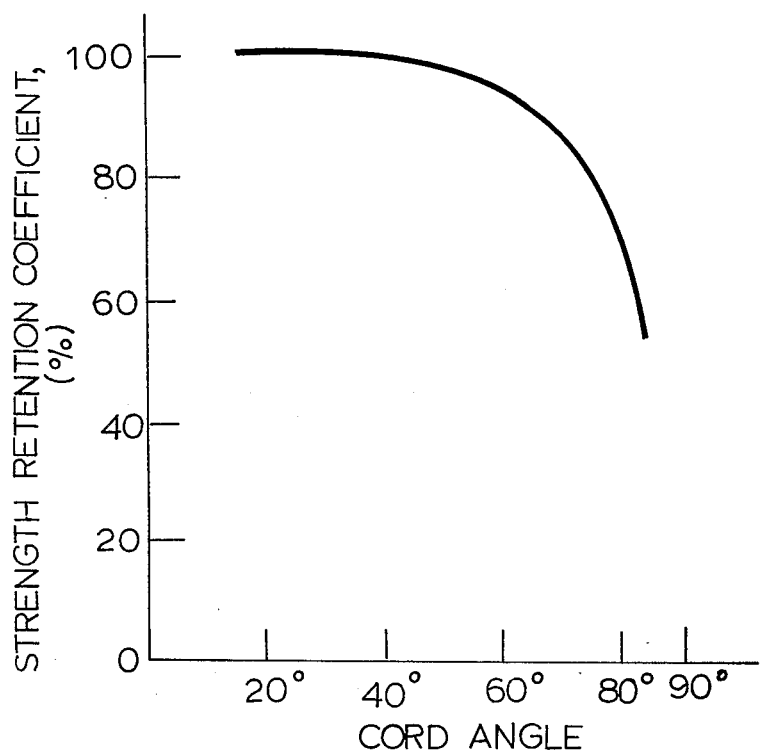
FIG. 5 is a graph showing the relationship between the cord angle of the organic fiber reinforcing layer and the strength retention coefficient.

FIG. 5 shows the relationship between the angle of the organic fiber reinforcing layer with respect to the circumferential direction of the tire and the strength retention coefficient, wherein the new tire of this invention is denoted as 100. It is obvious from FIG. 5 that the cord strength retention coefficient showed an abrupt reduction when the cord angle of the organic fiber reinforcing layer was in excess of 75°.

Moreover, Table 2 shows the findings of experiments for investigating the effects of the crossing angle α of the cords in the organic fiber reinforcing layer with the cords in the steel chafer. Test tires were 1000 R 20 and 14PR and had three carcass plies using 1500 d/3 polyester cords. The height H of the steel chafer was 55 mm and the maximum height h of the edges of the folded carcass plies was 45 mm. The organic fiber reinforcing layer was made of 840 d/2 cords with 20 end counts/25 mm. The angle of the steel chafer (chafer angle) with respect to the circumferential direction of the tire was 25° and 30°, the angle of the organic fiber reinforcing layer (reinforcing layer cord angle) with respect to the circumferential direction of the tire was one of five choices and the crossing angle (α) of the steel chafer cords with the reinforcing layer cords was one of five choices. The indoor tests were conducted with a JIS (Japanese Industrial Standard) load of 2700 (kg)×180%, an inflation pressure of 7.25 Kg/cm² and a running distance of 15000 Km.

TABLE 2

| Tire No. | chafer angle | reinforcing layer cord angle | crossing angle (α) | evaluation |
|---|---|---|---|---|
| I | 25° | 15° | 10° | cracks in steel chafer end |
| II | 25° | 25° | 0° | 15mm separation of steel chafer cords |
| III | 25° | 30° | 5° | 12mm separation of steel chafer cords |
| IV | 25° | 40° | 15° | 3mm separation of steel chafer cords |
| V | 30° | 30° | 0° | 12mm separation of steel chafer cords |
| VI | 30° | 40° | 10° | 4–5mm separation of steel chafer cords |
| VII | 30° | 50° | 20° | 2–3mm separation of steel chafer cords |

The foregoing table indicates that, for the tires where the cord angle of the steel chafer with respect to the circumferential direction of the tire was 15°–45° and the cord angle of the organic fiber reinforcing layer with respect to the circumferential direction of the tire was 20°–75°, the tires II, III and V having a crossing angle α of the organic fiber reinforcing layer cords with the steel chafer cords of between 0° and 5° gave unsatisfactory results, whereas the tires I and VI having a crossing angle 10° and the tires IV and VII having a crossing angle more than 10° showed great improvement in durability. It is apparent from the foregoing that a crossing angle of 10° or more is effective to improve durability of the bead region.

What is claimed is:

1. A radial tire comprising: a bead core; a carcass ply structure having a plurality of carcass plies made of multi-layered polyester cords, at least part of said plurality of carcass plies being folded around said bead core from the inside of said bead core, with respect to the inside of the tire, to the outside thereof and any remaining carcass plies terminate to the inside or to the radially inner side of the bead core, a steel chafer formed of steel cords and provided outside the folded portions of the carcass plies, and at least one reinforcing layer of organic fiber cords further provided outside the steel chafer and extending radially outwardly of the tire past the end of the steel chafer, the angle of the cords of the steel chafer with respect to the circumferential direction of the tire being 15°–45°, the radial dimension H of the steel chafer being 25–28% of the radial dimension of the inside of the tire, the maximum radial dimension h of the edges of the folded carcass plies being at most 85% of the dimension H of the steel chafer, and the cords in the reinforcing layer being disposed at an angle of 20°–75° with respect to the circumferential direction of the tire crossing the cords of the steel chafer at an angle of at least 10°.

2. A radial tire as claimed in claim 1, wherein the maximum dimension h of the edges of the folded carcass plies is 82% of the dimension H of the steel chafer.

3. A radial tire as claimed in claim 1, wherein the maximum dimension h of the edges of the folded carcass plies is 83% of the dimension H of the steel chafer.

4. A radial tire as claimed in claim 1, wherein the number of carcass plies is three, and each ply has 1500 d/3 polyester cords, and the organic fiber reinforcing layer is made of 840 d/2 cords.

* * * * *